United States Patent [19]
Holt et al.

[11] 3,883,796
[45] May 13, 1975

[54] PROXIMITY PROBE WITH OUTPUT PROPORTIONAL TO TARGET DISTANCE

[75] Inventors: Frederick R. Holt, Cleveland; Noah Flueckiger, Solon, both of Ohio

[73] Assignee: Acme-Cleveland Corporation, Cleveland, Ohio

[22] Filed: Sept. 5, 1972

[21] Appl. No.: 286,276

[52] U.S. Cl. .................. 324/34 PS; 324/41; 331/65
[51] Int. Cl. ........................................... G01r 33/00
[58] Field of Search .......... 324/34 D, 34 PS, 34 O, 324/41, 40; 331/65; 340/258 R, 258 C, 38 L

[56] References Cited
UNITED STATES PATENTS

| | | | |
|---|---|---|---|
| 2,895,108 | 7/1959 | Haddad et al. | 324/41 |
| 3,469,204 | 9/1969 | Magyar et al. | 331/65 |
| 3,609,580 | 9/1971 | Thompson et al. | 331/65 |
| 3,715,659 | 2/1973 | Abnett et al. | 324/340 |
| 3,747,011 | 7/1973 | Buck | 331/65 |

FOREIGN PATENTS OR APPLICATIONS
| | | | |
|---|---|---|---|
| 1,951,137 | 5/1971 | Germany | 324/41 |

Primary Examiner—Robert J. Corcoran
Attorney, Agent, or Firm—Woodling, Krost, Granger & Rust

[57] ABSTRACT

A proximity probe circuit is disclosed which is responsive to the distance between a proximity probe and a conductive or an inductive target, and has an output directly proportional to the distance between the probe and a conductive target. An amplifier is connected as an oscillator in a bridge circuit with the probe in one arm of the bridge and variations of probe to target distance change the input to the amplifier. An output circuit is connected to the output of the amplifier and has a variable negative feedback to decrease the input to the amplifier as the output of the amplifier increases. This is accomplished by light emitting diodes and light sensitive resistors in one embodiment of the invention and the output circuit provides a means for determining an output voltage proportional to the probe to target distance.

13 Claims, 2 Drawing Figures

PROXIMITY PROBE WITH OUTPUT PROPORTIONAL TO TARGET DISTANCE

BACKGROUND OF THE INVENTION

Proximity probe circuits have been used to count metal containers moving along a conveyor line, for example, where accuracy of count is not of paramount importance. The prior art proximity probe circuits have generally been of the on-off variety acting as a switch indicating either a "GO" or a "NO GO" conditions. This is satisfactory for counting objects and actuating a counter or the like but it is not helpful to determine the relative sizes of a series of objects, for example, nor used to determine exactly how far away the target is from a preset point, nor used to grade a number of objects according to size, nor used to measure the velocity of approach and the direction of motion of a target.

Proximity switch circuits of the prior art have the defect that if one changed the length of cable connecting the probe to the circuit, one also had to change the capacitance in order to maintain a definite frequency. Also such prior art circuits were required to keep an absolute value of voltage and hence were not at all suitable for determining small changes of probe to target distance with any real sensitivity or repeatability.

Accordingly, an object of the invention is to obviate the above-mentioned disadvantages.

Another object of the invention is to provide a proximity probe circuit which has a generally fail-safe condition and which may be used to relatively size a number of targets and to convey information as to the velocity of approach and direction of movement of such target.

Another objecct of the invention is to provide a proximity probe circuit with multiple sensing with one sensing probe.

SUMMARY OF THE INVENTION

The invention may be incorporated in a proximity probe circuit, comprising in combination, an amplifer having an output and an input, feedback means connecting said amplifier output to said amplifier input, a proximity probe, means connecting said probe as part of said feedback means to produce a signal at said input of said amplifier which is variable in accordance with the distance from said probe to a conductive target and output means connected to said amplifier to obtain an output variable in accordance with said variable input to said amplifier.

Other objects and a fuller understanding of the invention may be had by referring to the following description and claims, taken in conjunction with the accompanying drawing.

DESCRIPTION OF THE PREFERRED EMBODIMENT

Figure 1:
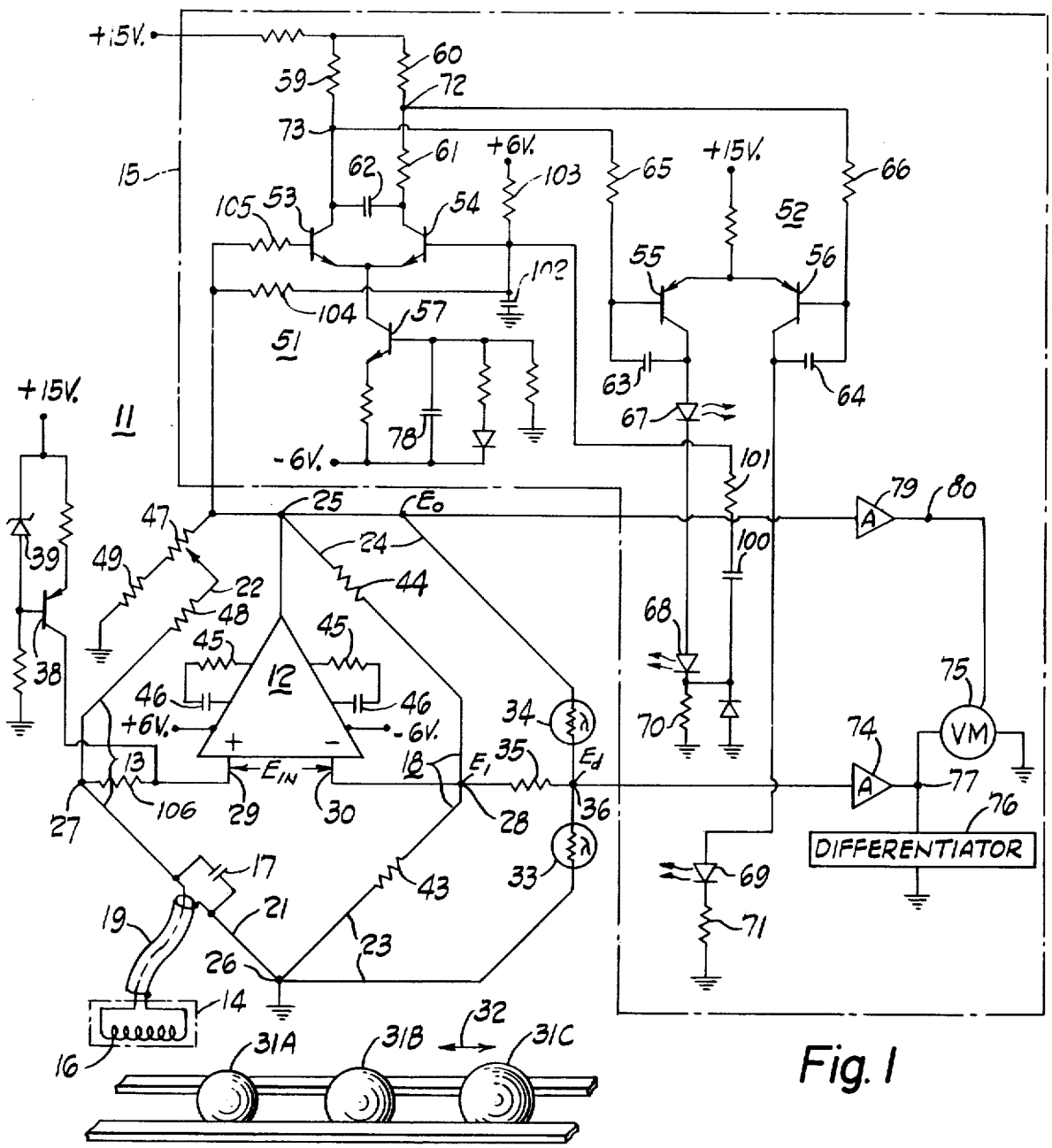
FIG. 1 is a schematic diagram of a circuit embodying the invention.

FIG. 1 is a schematic diagram illustrating the basic form of the invention and shows a proximity probe circuit 11 which includes generally an amplifier 12, feedback means 13, a proximity probe 14, and output circuit means 15. The amplifier 12 is connected as an oscillator with the frequency of oscillation controlled by a resonant circuit consisting of inductive means 16 and capacitive means 17. The proximity probe is connected as a part of the inductive and capacitive means and may be the inductive coil 16 which is influenced by its proximity to a conductive target. In a well-known manner, as the distance to a conductive target decreases, the increasing eddy current losses in the conductive target lower the Q of the parallel resonant circuit to change the total impedance across such resonant circuit.

The feedback means 13 is included in a bridge circuit 18. This bridge circuit performs double duty as the generator or oscillator in combination with the amplifier 12. The bridge circuit 18 has first through fourth arms 21-24, respectively. The feedback means may be considered as having negative feedback means and positive feedback means to the amplifier 12. The negative feedback means includes the bridge arms 23 and 24 and the positive feedback means includes the bridge arms 21 and 22. The bridge 18 has first and second input terminals 25 and 26, respectively, with terminal 26 grounded, and has first and second output terminals 27 and 28, respectively. The amplifier 12 has an output connected to the bridge first input terminal 25. Amplifier 12 also has positive and negative input terminals which also are known as noninverting and inverting terminals, respectively. The positive input terminal 29 is connected to the bridge first output terminal 27 which is at the junction at the first and second bridge arms 21 and 22. The amplifier negative input terminal 30 is connected to the bridge second output terminal 28 which is at the junction of the bridge arms 23 and 24. A conductive target is represented by the balls 31 and the arrow 32 indicates that they may move in a path in proximity with the proximity probe 14. Balls 31A, B and C are shown and these are shown removed from the vicinity of the probe 14. In this condition the parallel resonant circuit 16-17 will have a high Q and a high impedance for a larger voltage there-across.

The negative feedback means includes generally the bridge arms 23 and 24. Bridge arm 23 includes a fixed resistor 43 and a first photo-resistor 33. Bridge arm 24 includes a fixed resistor 44 and a second photo-resistor 34. A resistor 35 interconnects the bridge output terminal 28 and an output terminal 36. The probe 14 is a part of inductive and capacitive means 16-17 and has been shown more specifically as having the inductive means 16 inside a housing represented by the dotted rectangle 14 and connected by a coaxial cable 19 to the remainder of the proximity probe circuit 11. The proximity probe circuit 11 may be quite small and mounted on a printed circuit board with plug-in connections between the circuit board and the inner end of the coaxial cable 19. The capacitive means 17 may be provided on the printed circuit board and the coxial cable 19 may be flexible to permit mounting of the probe 14 in any suitable location. Alternatively all or part of the capacitive means 17 may be provided within the housing 14 and this has the advantage of minimizing the circulating currents within the parallel resonant circuit 16-17 from flowing through the coaxial cable 19.

A positive DC operating voltage is supplied to an operating voltage input terminal of the amplifier 12 and in one practical circuit constructed according to this invention, an RCA operational amplifier CA-3029 was used satisfactorily. Resistors 45 and capacitors 46 are used for frequency compensation and connected to frequency compensation terminals of the amplifier 12. The second bridge arm 22 includes a potentiometer 47 and fixed resistors 48 and 49. The variation of the potentiometer 47 provides a variable preset point to vary the dynamic range of the proximity probe circuit. A transistor 38 connected as a constant current source because of a breakdown diode 39, is connected to the amplifier input terminal 29 to supply a regulated DC voltage and thus establish the DC operating range of the amplifier 12.

The output circuit means 15 includes detector means 51 and an amplifier stage 52. The detector means 51 includes a first pair of differential transistors 53 and 54 and the amplifier stage includes a second pair of differential transistors 55 and 56. The detector means 51 includes a constant current generator shown as a transistor 57. This develops a constant current by having a fixed bias between the emitter resistor and a negative six-volt source. The oscillator frequency in one circuit constructed in accordance with the invention was in the range of 100–300 KHz. The detector means 51 is connected to the output of the amplifier 12. The bases of both transistors 53 and 54 are driven from the amplifier output 25 but the base of transistor 54 is bypassed to ground at oscillator frequencies by the bypass capacitor 102. Operating voltage such as 15 volts positive DC is supplied to the output circuit 15. The output of the transistors 53 and 54 appears across resistors 59 and 60, respectively, with a resistor 61 providing additional voltage drop in connection to the collector of transistor 54. Terminals 72 and 73 are at the lower end of output resistors 60 and 59, respectively. This output from terminals 72 and 73 is fed to the amplifier stage 52 by supplying a base drive to the transistors 55 and 56. A low-pass filter eliminates the oscillator frequency and passes a signal to the amplifier stage 52 and this filter network includes capacitors 62, 63 and 64 and resistors 65 and 66. The transistor 55 has its output at its collector connected through an optional indicator light emitting diode 67, a control light emitting diode 68 and a resistor 70 to ground. The collector of transistor 56 is connected through a control light emitting diode 69 and the resistor 71 to ground. The light emitting diode 68 is in proximity to and affects the light sensitive photo-resistor 34 and the light emitting diode 69 is in proximity to and affects the light sensitive photo-resistor 33. By this means a negative feedback loop is established from the detector 51 through the amplifier stage 52 to the bridge arms 23 and 24. The photoresistors 33 and 34 perform double duty in that they also establish an output at the output terminal 36 as a part of the output circuit means 15. This output is supplied to an output amplifier 74 so as not to load the voltage appearing at terminal 36. Amplifier output terminal 25 is connected through an amplifier 79 to a terminal 80. the output amplifiers 74 and 79 may optionally supply a raiometric voltmeter 75 or a differentiator 76 through a terminal 77. Amplifiers 74 and 79 are high input impedance ultra-stable low pass DC amplifiers.

A capacitor 78 of large enough value to provide a slight time delay in the turn-on of transistor 57 is provided between base and ground. For example, this might have a value of 5.0 mfd and this eliminates false outputs in the output by delaying the turn-on of this constant current generator 57. The time delay establishes time enough for the bridge circuit 18 and the amplifier 12 to settle down to a steady state condition. An auxiliary feedback circuit is provided for dynamic stability under closed loop conditions in the preferred embodiment. This network consists of resistor 70, capacitor 100, resistor 101, capacitor 102 and resistors 103 and 104. This feedback network is connected to the base of transistor 54 and resistor 105 is connected in the base circuit of transistor 53.

OPERATION

In electronics, the measurement of small changes in parameters is best handled by a bridge circuit operating in a manner analogous to the familiar two-pan beam balance used in the chemistry lab. In this manner, the number of variables affecting measurement accuracy may be drastically reduced and those variables left selected to be of such a type as to be most stable. The object of the invention is just such a stable bridge 18, wherein the proximity probe 14 is one arm of the bridge. A further object of the invention is that the bridge be self-balancing; that is, that a fully electronic proportional control servo-loop be established forcing the bridge into a near-balance condition whenever a target 31 varies its position relative to the proximity probe 14. A further object of the invention is to provide an electrical output proportional to the degree that the proximity probe is influenced by the distance to the target. The analysis of the system as a whole will be broken up into two parts. First, the conditions for oscillation will be considered wherein the negative feedback side of the bridge with arms 23 and 24 will be considered fixed and of equivalent resistances $R_{23}$ and $R_{24}$, respectively. That is, the entire network of resistors 33, 34, 35, 43, 44 has a two resistor equivalent: $R_{23}$ and $R_{24}$. Also, the resistors 47, 48 and 49 will be considered as their equivalent $R_{22}$ connected from terminal 25 to terminal 27. Secondly, the effect of varying the resistors 34 and 33 will be analyzed.

For analysis of the present system, one side of the bridge 18 may first be considered as consisting of two fixed resistors $R_{23}$ and $R_{24}$, which also can be considered as negative feedback loop around the amplifier 12. $\beta$ is defined as:

$$\beta = \frac{R_{23}}{R_{23} + R_{24}} \qquad (1)$$

The amplification A of amplifier 12 is in the order of 1,000 or 10,000 yet $\beta$ in the preferred embodiment is large; that is, between 0.1 and 1.0, and preferably between 0.2 and 0.4. The other side of the bridge consists of 21 and 22. 22 is considered as a resistor, the effective value of which may be adjusted, and for analysis will be called $R_{22}$. 21 consists of an inductor 16 of value L, together with a capacitor 17, the value of which includes distributed and cable capacitances. The total value of 17 will be called C. The inductor 16 and capacitor 17 are connected and analyzed as a parallel resonant circuit. Since the inductor 16 has inherent loss, all losses in the resulting arm 21 will be considered as an equivalent ohmic resistor in series with 16 and called $R_s$. The characteristics of the bridge arm 21 are analyzed at the frequency of resonance.

From the viewpoint of the resonant circuit, the addition of $R_{22}$ causes the input impedance of the amplifier 12 to appear negative, and when this negative resistance is sufficiently small, the losses due to $R_s$ are made up for and the circuit oscillates. It should be noted that the above remarks relate to the analytic method used and do not restrict the circuit itself. Other methods of analysis (Bode's method for example) can be used with the same results. Derivations are straight forward and no further assumptions are made.

The resonant circuit may be transformed to its parallel equivalent at resonance by:

$$R_{21}\omega_r = \frac{R_s^2 + \omega^2 L^2}{R_s} \quad (2)$$

$$= \sqrt{\frac{1}{LC} - \frac{R_s^2}{L^2}} \quad (3)$$

$\omega$ is defined as usual with $\omega = 2\pi f$, with $\omega$ being the frequency at resonance. The amplifier 12, with negative feedback through $R_{23}$ and $R_{24}$ and positive feedback through $R_{22}$ has negative resistive input impedance of magnitude:

$$\frac{R_{22}\beta}{1-\beta} \quad (4)$$

Oscillation will occur when the inequality:

$$\frac{R_{22}\beta}{1-\beta} \leq R_{21} \text{ holds.} \quad (5)$$

We note that oscillations will increase in amplitude until limited by the large signal characteristics of the amplifier and the power supplies as long as:

$$\frac{R_{22}\beta}{1-\beta} < R_{21} \quad (6)$$

The amplitude of the oscillations will remain constant at a level below amplifier limiting sets in only when:

$$\frac{R_{22} \cdot \beta}{1-\beta} = R_{21} \quad (7)$$

In passing, we note that equation (7) does not in general describe a stable state since our beam balance, as it were, is extremely sensitive.

Since neither $R_{22}$ nor $\beta$ are functions of $\omega$ over the range of interest, it would be convenient to drop $\omega$ from equation (2) at least directly. Using the conventional definition of Q; $Q = \omega L/R_s$, we get:

$$R_{21} = \frac{L}{C} \cdot \frac{Q^2}{+1} \quad (8)$$

and the simplified approximation:

$$R_{21} = \frac{L}{R_sC}, \text{ at resonance if Q is large} \quad (9)$$

which will be useful later.

Since it is central to the concept of the invention, it is instructive to note that the amplitude of oscillations as described in the transition from the inequality (6) to the equation (7) is accomplished by a bridge unbalance of a very small magnitude: the preferred embodiment of FIG. 1 operates on a bridge unbalance of between 100 ppm to 200 ppm. This small degree of bridge unbalance may be translated into an equivalent incremental distance from probe-to-target, $\Delta D$ sufficient to produce the aforementioned bridge unbalance. $\Delta D$ is termed an uncertainty only because it is derived by assigning a finite but large number for the open loop gain of the amplifier A, and in practice, this large but finite number is subject to wide tolerances.

Differential analysis and laboratory experiments confirm the following table of uncertainties for a two-inch diameter sensor at a probe-to-target distance D and uncertainty $\Delta D$ in inches.

| D | $\Delta D$ |
|---|---|
| 1.400" | 0.008" |
| 1.200 | 0.003 |
| 1.000 | 0.0013 |
| 0.800 | 0.0005 |
| 0.600 | 0.0002 |
| 0.400 | 80 millionths |
| 0.200 | 35 millionths |
| 0.100 | 20 millionths |

The second part of the analysis examines the negative feedback portion of the bridge; that is, arms 23 and 24. We observe first that a voltage appearing at terminal 25, called $E_0$ hereinafter, is attenuated by an H network wherein the portion of $E_o$ which appears at terminal 28 is called $E_1$ and the portion which appears at terminal 36 is called $E_d$. This H network contains two variable resistors 34 and 33. We assume no properties for resistors 34 and 33 except that they are linear (that is, that Ohm's law holds at least to a first approximation for both large and small signals) and that they may be varied. By way of example, resistors 33 and 34 may be light sensitive as shown in the art other devices may be substituted to the same effect, in particular, a Field Effect Transistor operating with an impressed source-to-drain voltage of a magnitude substantially less than the pinch-off voltage of said transistor functions as a resistor made variable by impressing a greater or lesser voltage upon the gate terminal of said transistor. As will become apparent in the following analysis, the properties of resistors 33 and 34 other than those specified do not affect the operation of the invention and this constitutes a substantial advance in the state-of-the-art.

Let the output voltage at terminal 25 be $E_0$, the input voltage at terminal 28 be $E_1$ and the detector output voltage at terminal 36 be $E_D$, then:

$$\beta = \frac{E_1}{E_0} \text{ in keeping with the rest of the specification} \quad (10)$$

$E_d$ will be considered as both an AC and DC voltage, the attenuation of the negative feedback network of $R_{33}$, $R_{34}$, $R_{35}$, $R_{43}$ and $R_{44}$ will, therefore, give us $E_1$ and thus $\beta$ and $E_d$ which will be later filtered and the DC portion used.

We note that the system is linear, so that $E_0$ may be set equal to 1 for simplicity of analysis. (Note closed loop system keeps $E_0$ constant).

Our problem is to find $E_d$ as function of $E_1$.

We start with the following set of loop equations:

$E_d = I_{R33} \cdot R_{33}$ $I_{R33} = I_{R34} + I_{R35}$, assuming $I_d = 0$ $I_{R44} = I_{R35} + I_{43}$, assuming $I_0 = 0$ $E_1 = I_{R43} \cdot R_{43}$
$I_{R44} \cdot R_{44} + E_1 = 1$
$I_{R35} = E_1 - E_{d/R35}$ The solution is tedious, and so we present the result:

$$E_d = E_1 \left( \frac{R_{35}}{R_{44}} + \frac{R_{35}}{R_{43}} + 1 \right) - \frac{R_{35}}{R_{44}} \quad (11)$$

$E_1 = \beta$, since $E_0 = 1$

Equation (11) is very interesting. If we realize that we have normalized the equation by setting $E_0 = 1$, then $E_1 = \beta$. Equations (7) and (9) must hold under the closed loop conditions $E_0 = 1$ and from these equations we get:

$$\frac{R_{22}\beta}{1-\beta} = \frac{L}{R_s C} \quad (12)$$

where $R_s$ = resistance of probe 14. Thus, $E_d$ is almost inversely proportional to $R_s$ (except for the $-R_{35/R44}$ term), and thus, we can expect the DC value of $E_d$ to follow the sensor head's Q in an approximate manner. Further the ratio of $E_0$ to $E_d$ is independent of everything except $\beta$. It is startling to realize that both $R_{33}$ and $R_{34}$ drop out of equation (11) but this is necessary, and by design, not accident. $R_{34}$, as well as $R_{33}$, is a photoresistor whose characteristics may be summed up by saying that its resistance is low when illuminated and high when dark. It has practically no other predictable, repeatable, or stable, characteristics. Thus, the results expressed in equation (11) are really needed if a stable, repeatable, proportional control system is to be used.

It is important to note that $E_0$ may be made to have both AC and DC components and thus $E_d$ will have both AC and DC components. The DC components of both $E_0$ and $E_d$ may be extracted by means of low-pass filters and the ratio of $E_d$ to $E_0$ utilized as information as to the target's effect upon the proximity probe. This is easy to accomplish by means well known to anyone skilled in the art. The contribution to the art described above is in the creation of ratio of $E_d$ to $E_0$ as a function of $R_{21}$.

The range of target distances within which the equation (12) may be made to hold is a function of proximity probe design, target characteristics $R_{48}$, $R_{44}$, $R_{43}$, $R_{47}$, $R_{35}$, $R_{49}$ and to a lesser extent, the range of $R_{34}$ and $R_{33}$. By way of example, for the values in the preferred embodiment of FIG. 1, $R_{48}$ is 8.25 K ohms, $R_{47}$ is 2 K ohms, $R_{49}$ is 2.2 K ohms, $R_{44}$ is 8.25 K ohms, $R_{43}$ is 3.91 K ohms, $R_{35}$ is 16.1 K ohms, the probe is two inches in diameter and the target is a two-inch diameter soft iron plate. $R_{47}$ is adjusted so that the ratio of $E_d$ to $E_0$ is 0.900 at a distance of 0.400 inches. In such actual circuit the ratio of $E_d$ to $E_0$ falls to 0.100 at a distance of 0.175 inches. Further by way of example, $R_{47}$ can be adjusted so that the ratio of $E_d$ to $E_0$ is 0.9 at a distance of 0.800 inches whereupon the ratio of $E_d$ to $E_0$ falls to 0.100 at a distance of 0.250 inches. These results are in conformity with the theory as may be verified from equations (11), (12) and the table showing D and $\Delta D$ by solution of a differential equation and extensive algebra.

For the purpose of explaining the operation of one preferred embodiment as shown in FIG. 1, we refer to the first example above wherein a 2-inch diameter sensor is used with a 2-inch diameter target, with the resistors 48, 47, 49, 44, 43 and 35 as previously specified and finally let the target distance be between the range limits of 0.075 inches and 0.400 inches; say, 0.300 inches.

For the moment, we will assume that equation (12) holds and oscillations appear at the output terminal 25 of amplifier 12. The base voltage of transistor 54 is at a fixed potential determined by the average DC potential at terminal 25, the +6 volt supply and the voltage divider with resistors 104 and 103. The AC voltage also present at terminal 25 appears at the base of transistor 54 in greatly diminished value by virtue of the bypass capacitor 102. The average DC potential at the base of transistor 53 is less than that appearing at the base of transistor 54 because $E_0$ has an average DC potential typically in the range of 1 to 2 volts and no voltage divider from 25 to the +6V supply is used. Typically, with no AC voltage appearing at 25, the base of transistor 53 is biased several hundred millivolts below the base of transistor 54. However, with oscillations occurring, the transistor 53 conducts on the positive peak excursions of $E_0$. By suitable selection of resistors 59 and 60 the voltage drop across resistor 59 can be made greater or lesser than that across resistor 60 depending on the amplitude of the oscillations. Capacitor 62 is part of the low pass filter. Transistor 57 operates as a constant current generator for the differential transistor pair 53 and 54.

Transistors 55 and 56 are connected as a differential pair coupled to the first differential pair by means of resistors 65 and 66. This second differential pair operates as an amplifier providing current to light-emitting-diodes 67, 68 and resistor 70 in series on one side and to light-emitting diode 69 and resistor 71 on the other side.

In operation, an increase in amplitude of the oscillations appearing at terminal 25 results in an increase in average current through transistor 53 with a corresponding decrease in current through transistor 54. This results in an increase in voltage across resistor 59 and a decrease in voltage across resistor 60. The amplifying action of transistors 55 and 56 result in more current through the light-emitting diodes 67 and 68 and more voltage to appear across resistor 70. At the same time, the current through light-emitting diode 69 decreases and the voltage across resistor 71 decreases. Thus an increase in amplitude of oscillations causes an increase in current through light-emitting diode 68 and also a decrease in current through light-emitting diode 69. As is well known, the light output of a light emitting diode increases with current through said diode.

The light emitting diode 68 is optically coupled to the light sensitive resistor 34 and the light emitting diode 69 is optically coupled to the light sensitive resistor 33.

Thus, an increase in amplitude of oscillations results in a proportional increase in light from diode 68 and a corresponding decrease in resistance of resistor 34, so that light sensitive resistors 33 and 34 act in push-pull. Similarly, an increase in amplitude of oscillations results in an increase in resistance of resistor 33. Further, if the amplitude of oscillations decreases, the above train of causes is reversed and the resistance of 34 increases and that of 33 decreases. The rate at which this occurs is controlled by a feedback loop that is active for transient conditions only. This feedback loop is a normal lag network consisting of capacitor 100 and resistor 101 coupling back to the base of transistor 54. Capacitor 100 is substantially larger than the bypass capacitor 102.

Now, it can be seen that if the oscillations were to increase in amplitude, for example, by moving the conductive target away from the proximity probe, resistor 34 would decrease and resistor 33 increase and thus the attenuation of the H network consisting of resistors 44, 43, 35, 34 and 33 is changed with the attenuation decreasing (that is, $E_1/E_0$ increases) with the ratio $E_d/E_0$ increasing much more sharply than the ratio $E_1/E_0$. Thus, as the attenuation of the H network decreases, $\beta$ increases. This is described precisely by equation (11) and the change in $\beta$ is in such a direction as to keep equation (12) holding. Thus we have a closed loop system wherein the bridge conditions described by equations (1) through (7) are obtained even though $R_s$ may change greatly.

To obtain a useful output, we wish to establish a DC voltage at terminal 25. To this end, a constant current generator, transistor 38 connected as shown in FIG. 1 forces a small DC current through resistor 106 which establishes a DC voltage at terminal 25 by virtue of the DC gain of the amplifier 12 and feedback means 13. Typically this voltage is between 1 and 2 volts. Now $E_0$ has both an AC (oscillations) and DC component, the DC component of which being conveyed to a very stable DC amplifier 79 appears at an output terminal 80. Another amplifier 74 substantially identical to 79 has an output terminal 77. By virtue of the mathematical analysis carried out above, the ratio of the voltages appearing at terminals 80 and 77 now give us precise knowledge as to the effects of a target on impedance $R_{21}$. Thus, feedback means 13 is both an AC and a DC feedback, and the DC amplifiers 74 and 79 and voltmeter 75 provide a means responsive to the direct current output of amplifier 12.

Figure 2:
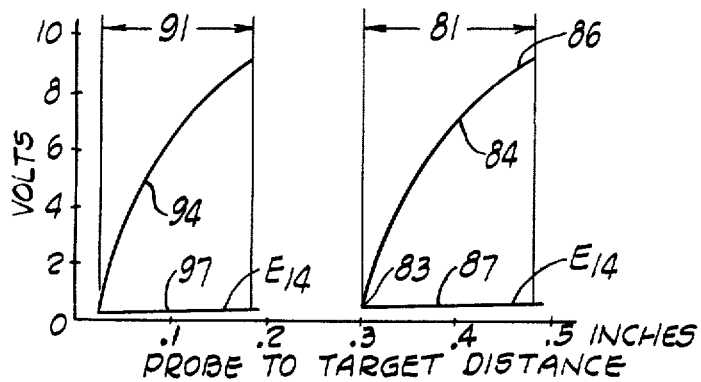
FIG. 2 is a graph of probed target distance versus voltage.

For further illustrating the operation of the system, a ratiometric voltmeter 75 is shown in FIG. 1 as connected with output voltage appearing at terminal 77 connected to one input of the voltmeter and the output voltage appearing at terminal 80 connected to the reference input of said ratiometric voltmeter. Typically such a voltmeter may be calibrated to read 1.000 to 9.000 for voltage input ratios of from 0.1000 to 0.9000, respectively. In FIG. 2 the Y-axis is marked for ratiometric voltmeter readings when calibrated as described above. The absolute magnitude of the voltages on terminals 77 and 80 is not important.

Curve 94 illustrates what can be generally expected for a particular setting of the potentiometer 47. The range 91 is that within which the closed loop equations are all met. Outside range 91, the ratio reading would fall below 1.000 or exceed 9.000 and would be a "NO GO" condition. If an open circuit, short circuit or other malfunction in probe 14 or cable 19 should occur, the ratio reading would drop below 1.000 and be a "NO GO" condition.

Curve 84 illustrates what can be generally expected for another different setting of the potentiometer 47. Here the range is larger than in the previous case.

Curves 97 and 87 are an exaggerated illustration of the rms Ac voltage across the resonant tank circuit. This voltage is shown to have a small positive slope which illustrates the fact that the self-balancing bridge is almost perfect, but not quite since there is a finite loop gain.

One use for the proximity probe circuit 11 is as a variable gaging system. Multiple sensing with one sensing probe is possible. Target ball 31B is shown larger than target ball 31A and smaller than target 31C. The voltmeter 75 may be calibrated to indicate diameter of the balls. If the center portion of the voltmeter scale is the nominal value for target 31B, then the smaller target ball 31A, being farther away from the probe 14, will establish a larger input voltage and hence a larger detector output voltage at terminal 36. This larger scale reading would be calibrated as the smaller diameter target ball 31A. Conversely the larger target ball 31C, when in proximity with the probe 14, would be the closest of any target to the probe, thereby decreasing the input voltage to the voltmeter 75. The ratiometric voltmeter 75 may then be calibrated with many different graduations such as "Do not accept, too large; accept, grade one; accept, grade two; accept, grade three; etc. up to Do not accept, too small."

The probe circuit 11 also provides possibility for precise measurement of the velocity of the approach or receding of a target. The differentiator 76 will take the derivative of the distance information and this gives the velocity and the positive or negative slope gives information as to whether the target is approaching or receding.

The above description has been based upon a conductive target. If a low-loss magnetically permeable target is used, then the output state is reversed for movements of the target. Such low-loss magnetic materials may be any number of zinc or manganese ceramics which are often called ferrites. Also, powdered iron may be used. With such a target, called herein a ferrite target, the magnetically permeable action exceeds the eddy current losses present in a conductive target even though magnetically permeable such as solid iron.

With the approach of a ferrite target, the inductance L increases more rapidly than the resistance $R_s$ increases and $R_{21}$ will increase rather than decrease.

By way of example, if the target is a ferrite target, the potentiometer 47 is set so that the ratiometric voltmeter reads 9.000 with a target present at the close end of the dynamic range, for example the 0.3 inch target distance of dynamic range 81. Then as the target recedes, the inductance L decreases faster than the resistance $R_s$ decreases, so $R_{21}$ decreases. With either target type, the aforementioned failsafe conditions prevail because the amplifier is oscillating during the dynamic range and when oscillations cease, a "NO GO" condition will be indicated, for example, by the ratiometric voltmeter 75.

The present circuit provides a very sensitive and highly stable and repeatable proximity probe circuit. In one practical embodiment of the invention wherein an integrated circuit comparator was used in place of the ratiometric voltmeter, the comparator changed states with a $\Delta D$ of 1/10 of a thousandth of an inch at a distance setting of 0.300 inches. The reasons for such improvement is completely understood, and set forth in the preceeding analysis.

The present disclosure includes that contained in the appended claims, as well as that of the foregoing description. Although this invention has been described in its preferred form and preferred practice with a certain degree of particularity, it is understood that the present disclosure of the preferred form and preferred practice has been made only by way of example and that numerous changes in the details of the circuit and the combination and arrangement of circuit elements and steps may be resorted to without departing from the spirit and scope of the invention as hereinafter claimed.

What is claimed is:

1. A proximity probe circuit, comprising in combination, an amplifier having an output and an input,
feedback means connecting said amplifier output to said amplifier input,
a proximity probe,
means connecting said probe as part of said feedback means to produce a signal at said input of said amplifier which is gradually variable in accordance with the change of distance from said probe to a conductive target,
a bridge circuit having arms as part of said feedback means,
variable means in said feedback means and included in two of said arms of said bridge circuit,
and output means connected to said amplifier and including means controlling said variable means in accordance with said amplifier output to decrease the input signal to said amplifier upon an increase of amplifier output.

2. A proximity probe circuit as set forth in claim 1, wherein said output means establishes an output directly proportional to the distance between said probe and a conductive target.

3. A proximity probe circuit as set forth in claim 1 wherein said variable means is a passive means.

4. A proximity probe circuit as set forth in claim 1, wherein said feedback means includes negative and positive feedback means,
and said variable means is included in said negative feedback means.

5. A proximity probe circuit as set forth in claim 1, wherein said variable means includes variable impedance means.

6. A proximity probe circuit as set forth in claim 1, wherein said variable means is a light sensitive variable means.

7. A proximity probe circuit as set forth in claim 6, including light-emitting means optically coupled to said light sensitive means,
and said output means including means connecting said light-emitting means to said amplifier output.

8. A proximity probe circuit as set forth in claim 7, wherein said output means connecting said light-emitting means to said amplifier output includes differential amplifier means.

9. A proximity probe circuit as set forth in claim 7, wherein said light sensitive means is a photoresistor and said light-emitting means is a photodiode.

10. A proximity probe circuit as set forth in claim 9, wherein said light-emitting means is connected to said amplifier output to effect an increase in light emission upon an increased amplifier output,
and said light sensitive means is connected in said feedback means to increase negative feedback to said amplifier upon illumination by said increased light emission.

11. A proximity probe circuit, comprising, in combination, an amplifier having an output and an input,
feedback means connecting said amplifier output to said amplifier input,
a proximity probe,
means connecting said probe as part of said feedback means to produce a signal at said input of said amplifier which is gradually variable in accordance with the change of distance from said probe to a conductive target,
variable means in said feedback means,
output means connected to said amplifier and including means controlling said variable means in accordance with said amplifier output to decrease the input signal to said amplifier upon an increase of amplifier output,
said variable means including first and second light sensitive means, and means connecting said light sensitive means to act in push-pull.

12. A proximity probe circuit, comprising, in combination, an amplifier having an output and an input,
feedback means connecting said amplifier output to said amplifier input,
a proximity probe,
means connecting said probe as part of said feedback means to produce a signal at said input of said amplifier which is gradually variable in accordance with the change of distance from said probe to a conductive target,
variable means in said feedback means,
output means connecting to said amplifier and including means controlling said variable means in accordance with said amplifier output to decrease the input signal to said amplifier upon an increase of amplifier output,
said amplifier having both an alternating and a direct current output,
said feedback means including alternating current feedback means feeding back alternating current to said amplifier input,
and said output means including means responsive to the direct current output.

13. A proximity probe circuit, comprising, in combination, an amplifier having an output and an input,
feedback means connecting said amplifier output to said amplifier input,
a proximity probe,
means connecting said probe as part of said feedback means to produce a signal at said input of said amplifier which is gradually variable in accordance with the change of distance from said probe to a conductive target,
variable means in said feedback means,
output means connected to said amplifier and including means controlling said variable means in accordance with said amplifier output to decrease the input signal to said amplifier upon an increase of amplifier output,
means supplying a direct current input to said amplifier wherein said amplifier acts as an oscillator and has both an alternating and a direct current output,
and said output means including means responsive only to the direct current output.

* * * * *